United States Patent
Brennesholtz

[19]
[11] Patent Number: 5,889,565
[45] Date of Patent: Mar. 30, 1999

[54] METHOD AND APPARATUS FOR IMPROVING THE COLOR RENDITION OF COLOR TELEVISION RECEIVERS

[75] Inventor: Matthew Scott Brennesholtz, Pleasantville, N.Y.

[73] Assignee: Philips Electronics North America Corporation, New York, N.Y.

[21] Appl. No.: 653,961

[22] Filed: May 28, 1996

[51] Int. Cl.[6] ............................. H04N 9/69; H04N 5/202; H04N 5/20

[52] U.S. Cl. ......................... 348/675; 348/676; 348/678; 348/674

[58] Field of Search ....................... 348/178, 179, 348/675, 679, 713, 645, 674, 676, 677, 678, 254; 358/164, 32; H04N 5/202, 5/20, 9/69

[56] References Cited

U.S. PATENT DOCUMENTS

| | | | |
|---|---|---|---|
| 3,737,561 | 6/1973 | Boer | 348/256 |
| 4,547,797 | 10/1985 | Mick | 358/27 |
| 4,558,363 | 12/1985 | Sugimoto | 348/676 |
| 4,589,022 | 5/1986 | Prince et al. | 348/602 |
| 5,083,198 | 1/1992 | Haferl et al. | 348/675 |
| 5,208,661 | 5/1993 | Jaspers | 358/32 |
| 5,398,076 | 3/1995 | Lum et al. | 348/676 |

*Primary Examiner*—Bryan Tung
*Assistant Examiner*—Nhon T. Diep
*Attorney, Agent, or Firm*—Edward W. Goodman

[57] ABSTRACT

A method and apparatus for improving the color rendition of a color television receiver includes variable gamma circuits for exponentially correcting the individual color signals. A user control is added to allow user control over the overall gamma of the color television receiver thereby rendering the colors more saturated. With the inclusion of this user gamma control, a separate control for brightness, which affects the overall bias on the CRT, is now obviated.

11 Claims, 2 Drawing Sheets

METHOD AND APPARATUS FOR IMPROVING THE COLOR RENDITION OF COLOR TELEVISION RECEIVERS

BACKGROUND OF THE INVENTION

1. Field of the Invention

The subject invention relates to improving the image on a display of a color television receiver as seen by the viewer by giving more true to life color.

2. Description of the Related Art

The current in a cathode ray tube (CRT), like other triode vacuum tubes, is a non-linear function of drive voltage. A power function fits the data quite well over several decades:

$$I = k * V^\gamma \qquad (1)$$

where I is the cathode or anode current, V is the CRT drive voltage, k is the transconductance, and γ is the gamma value depending on the detailed design of the electron gun in the CRT.

Conventionally, the value of γ for grid drive CRT's is taken to be 2.2, and for cathode drive CRT's, γ is taken to be 2.8 In addition, it is normally assumed that γ for each of the three guns in a color CRT is the same. For direct view CRT's, it is also normally assumed that the phosphors are linear with current.

While it has been found that these assumptions are not accurate, the errors introduced are to such a small extent that if only luminance and monochrome images are examined, it will make little difference. However, when chromaticities of desaturated colors are examined, the errors introduced can be large. One manifestation of this is the difficulty in getting satisfactory skin tones on a CRT display.

However, these assumptions are built into the television industry. Receiver manufacturers expect gamma correction and color encoding to be controlled by broadcasters and other video sources to match the CRT characteristics specified by the NTSC standard. However, the CRT defined by the NTSC standard bears little relationship, in terms of γ or chromaticity, to CRT's currently in production. Receiver manufacturers add decoding circuits to partially correct for the color differences, but do not correct for the gamma differences. This decoding is done by the receivers to display the most pleasing picture on the screen, which is not always the picture with the most accurate color rendition. Color errors of one type are used to balance errors of a different type, leading to improvement in one portion of the color gamut and a degradation in another region.

Studies have identified three major sources of color error:

(1) Cathode bias offset from the correct value for the particular tube in a television receiver;

(2) Differential γ between the red, green and blue colors (R, G and B) in a television receiver, these gamma differences arising either from differences between the red, green and blue guns in a CRT, or from phosphor non-linearities; and (3) Gamma difference between the broadcast signal with a nominal γ of 2.2 and the receiver γ.

In regard to error (3), measured receiver γ values were in the range of 2.1–2.7.

In correcting these errors, manufacturers deliberately introduce errors of type (1) to partially cancel the errors of type (2). If type (1) errors are corrected without correcting type (2) errors, the accuracy of the color rendition is actually reduced. Therefore, it is necessary to correct both of these type of errors simultaneously in order to improve the color rendition. As such, equation (1) may be modified as follows:

$$I_k = k(V_s + V_{ERROR})^\gamma \qquad (2)$$

where $V_s$ is the signal voltage, $V_{ERROR}$ represents an error in setting the cathode cutoff value, or a deliberate mis-setting of the cutoff, and γ is the gamma of each gun. If $V_{ERROR}$ is positive, the gun produces some current at 0 $V_s$. If $V_{ERROR}$ is negative, the gun produces 0 current for all $V_s \leq V_{ERROR}$ The "brightness" control on the CRT receiver allows the consumer to offset all three guns with the same $V_{ERROR}$.

With regard to type (3) errors, studies have shown that consumer actually prefer pictures when there is a positive type (3) error, that is, when $\gamma_{RECEIVER} > \gamma_{BROADCAST}$, or $\gamma_{RECEIVER} > 2.2$ Under these conditions, the colors on the screen tend to be more saturated, i.e., more "vivid".

SUMMARY OF THE INVENTION

It is an object of the present invention to provide a method and apparatus that will correct type (1) and (2) errors, and give the consumer control of type (3) errors.

This object is achieved in a method for improving the color rendition of a color television receiver having separate color channels, comprising the steps of generating separate color signals; performing a separate gamma correction on each of the color signals; adjusting a bias setting for each of said gamma corrected color signals; and adjusting a high level drive setting for each of said gamma corrected and bias adjusted signals, wherein said step of performing a separate gamma correction comprises raising each color signal to an exponential power γ which is adjustable between 0.9 and 1.35 in accordance with the relationship:

$$V_{OUT} = V_{IN}^\gamma$$

where γ is the overall gamma of the camera gamma correction, the gun for each color signal, and the phosphors, whereby said color signals are corrected to eliminate a differential gamma between the separate color channels.

This object is further achieved in an apparatus for improving the color rendition of a color television receiver having separate color channels, said apparatus comprising means for generating separate color signals for the respective separate color channels; means for performing a separate gamma correction on each of the color signals; means for adjusting a bias setting for each of said gamma corrected color signals; and means for adjusting a high level drive setting for each of said gamma corrected and bias adjusted signals, wherein said means for performing a separate gamma correction comprises means for raising each color signal to an exponential power γ which is adjustable between 0.9 and 1.35 in accordance with the relationship:

$$V_{OUT} = V_{IN}^\gamma$$

where γ is the overall gamma of the camera gamma correction, the gun for each color signal, and the phosphors, whereby said color signals are corrected to eliminate a differential gamma between the separate color channels.

As noted above, correcting type (1) errors alone, without correcting type (2) errors, leads to an actual degradation in color accuracy. A predominant number of the automatic bias control circuits known have assumed that a constant $V_{ERROR}$ in equation (2) would be maintained by the circuit, but that the error would not necessarily be zero. Type (2) errors can be corrected without automatic bias control to give zero bias error. This will give an improvement in color accuracy, if it is done on each of the three colors R, G and B separately. In the past, this has often been done on the luminance channel (Y) of the video signal, but offers no control over type (2) errors. In fact, the application of a Y channel gamma correction will actually make color errors worse, even while it improves luminance errors.

Color errors are most noticeable in flesh tones. If a displayed color is in the "skin tone region", current practice is to introduce a color error to force that color to a true skin tone. This system has several problems. First, it tends to make everyone's skin tone the same color, which is not right in a modern multi-cultural society. Next, if some non-human object is in this color region, the color of the object is forced to a skin tone with sometimes strange results. Finally, this approach corrects only the most visible symptom of the underlying color errors which can be type (1), (2) or (3) or can be due to some other cause like incorrect decoding of the NTSC video signal. With proper γ error correction in the receiver, the problems and costs of a flesh tone correction circuit can be avoided.

Past practice has been to have two controls called "COLOR" or "CHROMA" and "TINT" or "HUE". Sometimes other names are used. These controls can partially correct type (2) errors, but that was not their original intention. These control adjust the decoding of the NTSC video signal, which is a chroma/luma type signal. As such, the controls bear no simple relation to the R, G and B errors introduced by the picture tube. In particular, as the video source changes, the NTSC errors change and the optimum color and tint settings can change.

Previous studies of color errors in CRT receivers assumed the R, G and B gamma values were the same. This assumption implied there were no errors of type (2), and therefore, no correction was in order.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENTS

Figure 1:
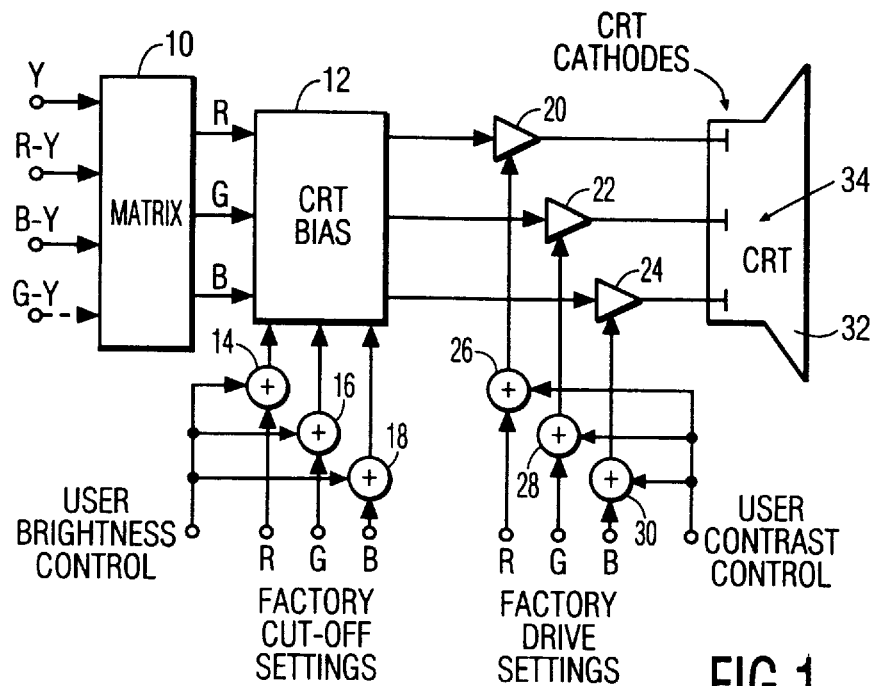
FIG. 1 is a block diagram of a known color television receiver.

FIG. 1 shows a partial block diagram of a color television receiver. A matrix circuit 10 is shown which receives a luminance signal (Y) and color difference signals (R-Y) and (B-Y) from a color demodulator circuit (not shown). In some color television receivers, a third color difference signal (G-Y) is available which contains no new information, but is a linear combination of the other three signals. The matrix circuit 10 then processes these 3 (or 4) signals to produce R, G and B color signals.

The R, G and B color signals are on the order of 1 volt, with black=0 and white=1. A CRT bias circuit 12 then receives these color signals and, in dependence on separate control values, sets the bias for the CRT. In particular, this CRT bias circuit 12 allows the adjustment of the black level for the three color signals such that with the particular CRT, a zero drive voltage produces no light output. This adjustment is effected by the receiver manufacturer. However, in order to allow for some user control of "brightness", the television receiver includes an input for receiving an adjustable "brightness" control value which is applied to first inputs of adders 14, 16 and 18 which have second inputs connected to receive the three factory cut-off settings. The outputs from the adders 14, 16 and 18 are applied to control inputs of the CRT bias circuit 12.

The outputs from the CRT bias circuit 12 are applied to separate variable gain amplifiers 20, 22 and 24 having outputs connected to the separate cathodes 34 of the red, green and blue guns in the CRT 32. The variable gain amplifiers 20, 22 and 24 are used to control the maximum luminance for each color on display. In order to set this value, the variable gain amplifiers 20, 22 and 24 have gain control inputs to which the receiver manufacturer applies separate correction values to adjust the maximum luminance for each color. Again, as with the CRT bias, provisions are made for user control of the resultant contrast. This is effected by adders 26, 28 and 30 having first inputs interconnected and connected to receive a user control value. Second inputs of the adders 26, 28 and 30 are connected to receive the factory adjusted drive setting values. Outputs from the adders 26, 28 and 30 are connected to the gain control inputs of the variable gain amplifiers 20, 22 and 24.

Figure 2:
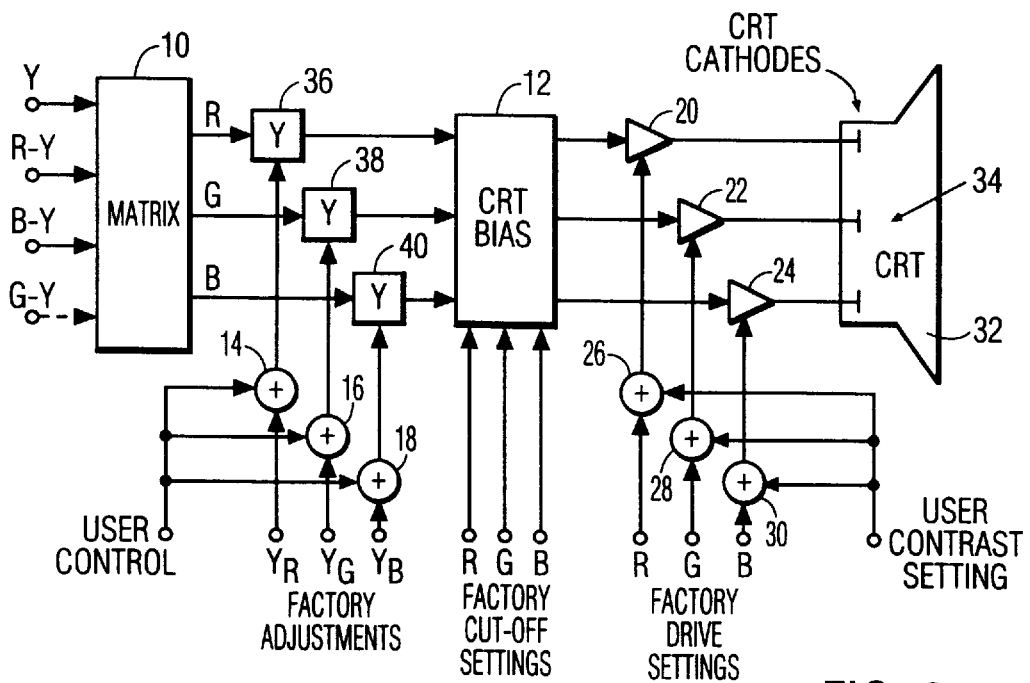
FIG. 2 is a block diagram of the color television receiver of FIG. 1 in which the subject invention is incorporated.

FIG. 2 shows a block diagram of a color television receiver which is similar to the color television receiver shown in FIG. 1, the same blocks carrying the same reference numbers. In each of the lines between the matrix circuit 10 and the CRT bias circuit 12, there is included a variable gamma (γ) circuit 36, 38 and 40. Each of these variable gamma circuits performs the function $V_{OUT}=V_{IN}^\gamma$. These variable gamma circuits allow for the correction of the type (2) errors, while the CRT bias circuit 12 corrects for the type (1) errors. To that end, the variable gamma circuits 36, 38 and 40 include gamma control inputs for receiving a manufacturer-adjusted setting value. As noted above, it is desirable for the overall gamma to be controllable by the user. At the same time, since now there is a user control for the gamma, there is no need for a user control for the overall bias. Hence, the subject invention contemplates using the adders 14, 16 and 18 couple the overall user control value to the factory settings to form the final control values for the gamma control inputs of the variable gamma circuits 36, 38 and 40.

Figure 3:
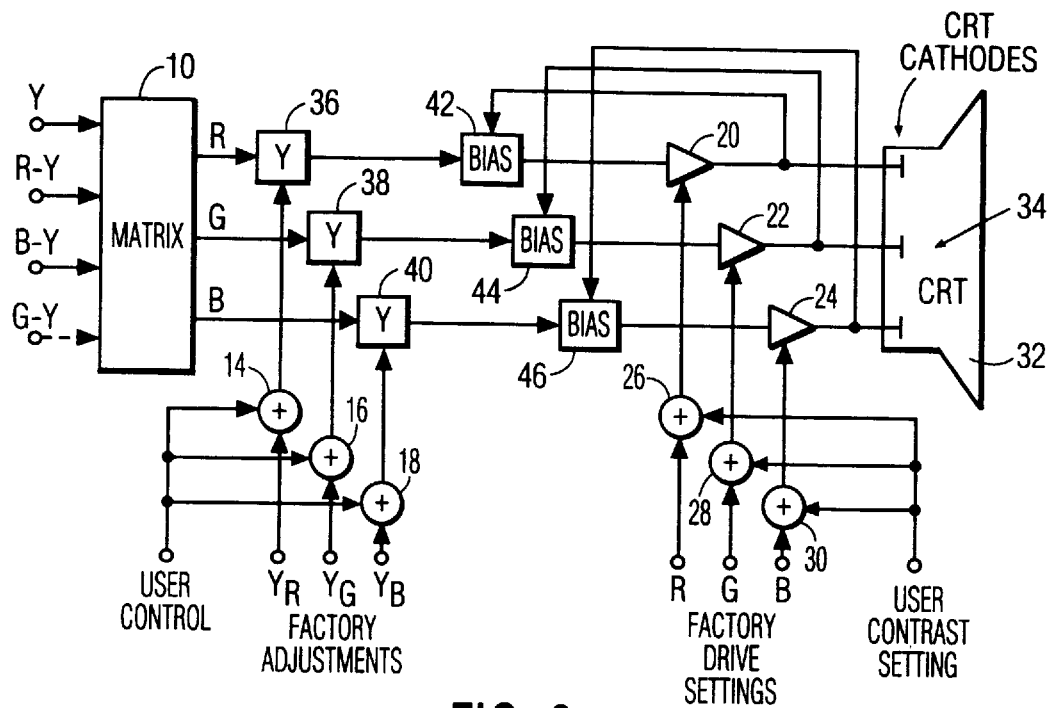
FIG. 3 is a block diagram of an improvement of the color television of FIG. 2.

FIG. 3 shows a preferred embodiment of the color television receiver of FIG. 2, in which the same blocks have the same reference numbers. In particular, since there is no user control over the bias, the factory cut-off setting of the bias may now be automated. In particular, the CRT bias circuit 12 is replaced by separate bias circuits 42, 44 and 46 which receive a feedback control signal from the output of the corresponding variable gain amplifier 20, 22 and 24. As such, the bias is automatically set for the correct black level conditions.

Figure 4:
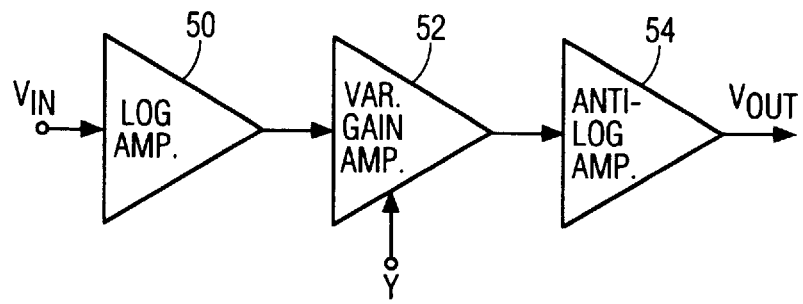
FIG. 4 is a block diagram of a circuit for producing variable γ.

FIG. 4 shows a block diagram of a variable gamma circuit for use in the color television receivers of FIGS. 2 and 3. In particular, the variable gamma circuit has a log amplifier 50 for receiving the color signal (R, G or B). A variable gain amplifier 52 has an input connected to the output of the log amplifier and a control input for receiving the gamma control value. Finally, an anti-log amplifier 54 has an input connected to an output of the variable gain amplifier 52 and an output for supplying the gamma corrected color signal. While each of these components are separately available, it has been found that in order for the log and anti-log amplifiers to co-operate properly, they must be maintained at the same temperature. Hence, the log and anti-log amplifiers should be formed on a same integrated circuit chip. To that end, it would be convenient to form the variable gain amplifier on the same chip. As a further convenience and to enhance economy, all of the variable gamma circuits 36, 38 and 40 may be formed on the same integrated circuit chip.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A method for improving the color rendition of a color television receiver with separate color channels, said television receiver including a cathode ray tube having a display screen carrying phosphors for generating light, and electron guns for generating electron beams for impinging on the phosphors, comprising the steps:

generating separate color signals for application to said electron guns, respectively;

performing a separate gamma correction on each of the color signals;

adjusting a bias setting for each of said gamma corrected color signals; and adjusting a high level drive setting for each of said gamma corrected and bias adjusted signals, wherein said step of performing a separate gamma correction comprises raising each color signal to an exponential power $\gamma$ which is adjustable between 0.9 and 1.35 in accordance with the relationship:

$$V_{OUT} = V_{IN}^{\gamma}$$

where $\gamma$ is the overall gamma of a camera gamma correction, the electron gun for each color signal, and the phosphors, whereby said color signals are corrected to eliminate a differential gamma between the separate color channels.

2. A method for improving the color rendition of a color television receiver as set forth in claim 1, wherein said step of adjusting a bias setting comprises adjusting the bias setting for each gamma corrected color signal in relation to a separate bias signal, corresponding, respectively, to said gamma corrected color signal, said separate bias signals being inputted to said color television receiver.

3. A method for improving the color rendition of a color television receiver as set forth in claim 1, wherein said step of adjusting a bias setting comprises automatically adjusting said setting for a predetermined black level condition.

4. A method for improving the color rendition of a color television receiver as set forth in claim 1, wherein said step of raising each color signal to an exponential power $\gamma$ comprises:

inputting a separate control signal for each of said color channels; and forming the relationship:

$$V_{OUT} = V_{IN}^{\gamma}$$

using said control signal.

5. A method for improving the color rendition of a color television receiver as set forth in claim 4, wherein said step of raising each color signal to an exponential power $\gamma$ further comprises:

inputting a control signal modifying value; and adding the control signal modifying value to each of said control signals.

6. An apparatus for improving the color rendition of a color television receiver having separate color channels, said television receiver including a cathode ray tube having a display screen carrying phosphors for generating light, and electron guns for generating electron beams for impinging on the phosphors, said apparatus comprising:

means for generating separate color signals for said respective separate color channels for application to said electron guns, respectively;

means for performing a separate gamma correction on each of the color signals;

means for adjusting a bias setting for each of said gamma corrected color signals; and means for adjusting a high level drive setting for each of said gamma corrected and bias adjusted signals, wherein said means for performing a separate gamma correction comprises means for raising each color signal to an exponential power $\gamma$ which is adjustable between 0.9 and 1.35 in accordance with the relationship:

$$V_{OUT} = V_{IN}^{\gamma}$$

where $\gamma$ is the overall gamma of the camera gamma correction, the electron gun for each color signal, and the phosphors, whereby said color signals are corrected to eliminate a differential gamma between the separate color channels.

7. An apparatus for improving the color rendition of a color television receiver as set forth in claim 6, wherein said means for raising each color signal to an exponential power $\gamma$, for each of said separate channels, comprises:

a log amplifier coupled to receive said color signal;

a variable gain amplifier having an input coupled to an output of said log amplifier, said variable gain amplifier having a gain control input for receiving a gain input signal $\gamma$; and an anti-log amplifier having an input coupled to an output of said variable gain amplifier, an output of said anti-log amplifier forming said gamma corrected color signal.

8. An apparatus for improving the color rendition of a color television receiver as set forth in claim 7, wherein said means for raising each color signal to an exponential power $\gamma$, further comprises means for maintaining said log amplifier and said anti-log amplifier at a same temperature.

9. An apparatus for improving the color rendition of a color television receiver as set forth in claim 8, wherein said log amplifier and said anti-log amplifier are formed on a same integrated circuit chip.

10. An apparatus for improving the color rendition of a color television receiver as set forth in claim 9, wherein said variable gain amplifier is also formed on said same integrated circuit chip.

11. An apparatus for improving the color rendition of a color television receiver as set forth in claim 10, wherein the integrated circuit chips, forming the log, anti-log and variable gain amplifier for the separate color channels, are formed as a single integrated chip.

* * * * *